(No Model.)
P. W. TILLINGHAST.
PNEUMATIC TIRE AND MEANS FOR INFLATING THE SAME.
No. 477,316. Patented June 21, 1892.
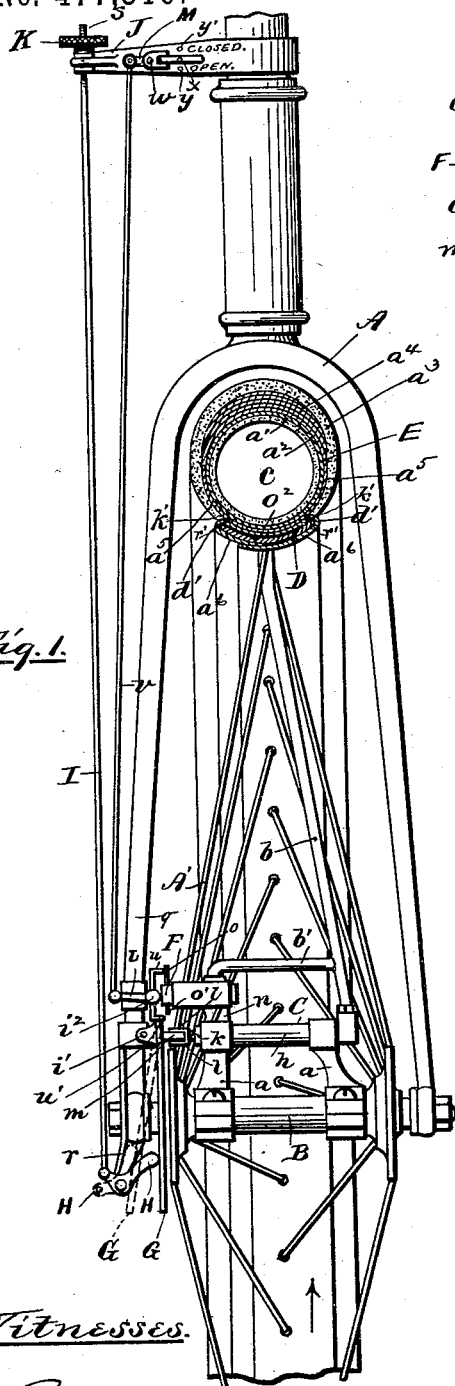
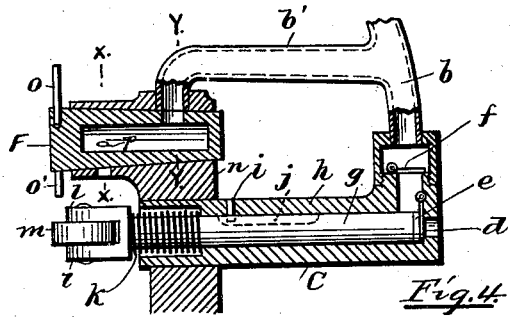
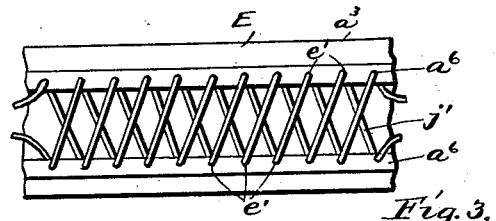
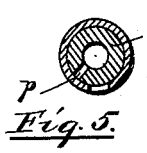
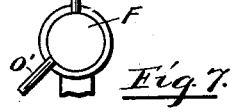
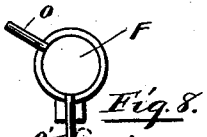
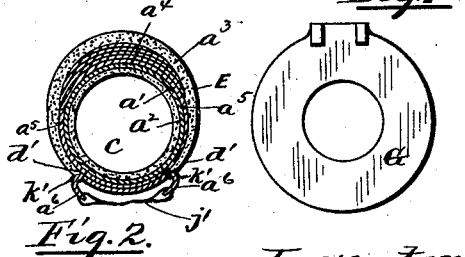
Witnesses.
Inventor.

UNITED STATES PATENT OFFICE.

PARDON W. TILLINGHAST, OF PROVIDENCE, RHODE ISLAND.

PNEUMATIC TIRE AND MEANS FOR INFLATING THE SAME.

SPECIFICATION forming part of Letters Patent No. 477,316, dated June 21, 1892.

Application filed June 8, 1891. Serial No. 395,615. (No model.) Patented in England June 17, 1891, No. 10,308.

*To all whom it may concern:*

Be it known that I, PARDON W. TILLINGHAST, a citizen of the United States, residing at Providence, in the State of Rhode Island, have invented a new and useful Improvement in Pneumatic Tires and Means for Inflating the Same, (patented in Great Britain June 17, 1891, No. 10,308,) of which the following is a specification.

My invention consists in the improved construction of the pneumatic tire, in the improved means for operating the air-pump for inflating the tire, and in an exhaust-valve for causing the air to pass out of the tire at the will of the rider, as hereinafter set forth.

Figure 1 represents a transverse section of the pneumatic tire and the rim of the wheel and an elevation of the air-pump when thrown out of action by the inward adjustment of the operating-cam. Fig. 2 represents a transverse section showing a modification in the attachment of the pneumatic tire to the rim of the wheel. Fig. 3 represents a detail view of the inner side of the rim, showing the laced attachment of the flaps shown in Fig. 2. Fig. 4 represents a longitudinal section of the air-pump and the exhaust-valve. Fig. 5 represents a section of the exhaust-valve, taken in the line $x\ x$ of Fig. 4. Fig. 6 represents a section of the exhaust-valve, taken in the line $y\ y$ of Fig. 4. Figs. 7 and 8 are end views of the exhaust-valve, showing the position of the engaging arms at the closed and open positions of the exhaust-valve. Fig. 9 represents a side view of the adjustable cam for operating the piston of the air-pump.

In the accompanying drawings, A represents a steering-fork, and A' the wheel, to the hub B of which by means of the arms $a\ a$ is attached the air-pump C, the said pump being provided with the pipe $b$, which passes through a perforation in the rim D of the wheel and enters the cavity $c$ of the pneumatic tire E. The air-pump C, which revolves with the wheel, is provided with the induction-valve $d$ for the admission of air to the chamber $e$ of the pump and the eduction-valve $f$ for the passage of air from the chamber of the pump to the air-chamber of the tire through the pipe $b$. The piston $g$ of the pump is prevented from turning within the barrel $h$ by means of the fixed pin $i$ and the slot $j$, made in the piston $g$, and is actuated to draw air into the chamber $e$ of the pump by means of the spring $k$. The outer end of the piston $g$ is provided with the ears $l\ l$, which support the friction-roller $m$, and the side of the barrel $h$ of the pump C is provided with the arm $n$, which carries the exhaust-valve F, the said valve being connected with the pipe $b$ by means of the pipe $b'$. The projecting end of the valve F is provided with the radial arms $o\ o'$, which serve to operate the valve in opposite directions to open or close the exhaust-passage $p$.

To the arm $q$ of the steering-fork A at the point $i'$ is hinged or pivoted the annular cam G, which by operating against the friction-roller $m$ serves to actuate the piston of the pump C inwardly against the resilience of the spring $k$ to compress the air and force the same into the cavity of the tire E, and the resulting throw of the piston $g$ may be varied at the will of the rider by means of the bell-crank lever H, pivoted to a downwardly-projecting arm $r$, which forms a continuation of the arm $q$ of the steering-fork, the said lever being made to bear against the outer side of the cam G, and operated to vary the inclination of the cam by means of the rod I, jointed to the outer end of the lever H and passing loosely through an opening in the arm J, which projects laterally from the upper end of the steering-fork, the rod I being provided with a screw-thread $s$, upon which, above the arm J, is placed the milled nut K, which is in convenient reach of the rider, and by turning the nut K the inclination of the cam G and the throw of the piston $g$ can be varied, as desired, so as to produce the required pressure of air in the cavity of the tire.

In Fig. 1 the cam G is represented in a position at right angles to the axis of the hub of the wheel A', at which position the vibrating movement of the piston $g$ of the air-pump will cease, thus throwing the pump out of action, and the position of the lever H and the cam G, when the piston is operated to the extreme of its vibrating movement, is shown by the dotted lines.

When the air has been forced into the tire under a considerable pressure and it is desired to employ a diminished air-pressure in the same, the surplus air in the tire may be allowed to escape by means of the exhaust-valve F, which is placed under the control of the rider by means of the lever L, which is pivoted to the arm $q$ of the steering-fork A at the point $i^2$ and provided with the inwardly-projecting pins $u$ $u'$, which, when the lever L is in its normal position, are out of the plane of engagement with the arms $o$ $o'$ of the valve F, the outer end of the lever L being connected with the hand-operated lever M by means of the connecting-rod $v$, the said lever M being pivoted to the arm J at the point $w$ and provided with a pin $x$, which is adapted to enter the holes $y$ $y'$, made in the arm J, upon the proper movement of the lever M to open or close the exhaust-opening at the valve F, an intermediate hole being preferably provided for holding the lever M in its middle position, as shown in Fig. 1. When the hand-operated lever M is thrown into engagement with the hole $y$ in the arm J, the upper pin $u$ of the lever L will be thrown forward, thus coming into the path of the upper arm $o$ of the valve F, (see Fig. 7,) and consequently causing the opening of the said valve, and upon the movement of the lever M into engagement with the hole $y'$ in the arm J the lower pin $u'$ of the lever L will be thrown forward, thus coming into the path of the lower arm $o'$ of the valve F, (see Fig. 8,) and consequently causing the closing of the said valve, and thus the valve may be opened and closed at the will of the rider, so as to secure the desired pressure of air in the tire to suit all circumstances. The tire E is also provided with an outer covering of rubber $a^3$, which is preferably thickened at the tread or outer portion of the tire, which portion comes in contact with the surface of the road and is liable to wear, and with an intervening thickening composed of several layers of canvas $a^4$, which also serves to thicken the wall of the outer side of the tire to a greater degree than the wall of its inner side, which is directly attached to the rim D of the wheel.

To a strip of canvas, which forms the connecting-flaps $a^5$ $a^5$ for the parts $a'$ $a^3$ of the tire, is attached the strip of canvas which forms the attaching-flaps $a^6 a^6$, which serve to attach the tire to the rim D of the wheel, the said latter flaps being either secured to the rim by means of cement, as shown in Fig. 1, or by means of a lacing $j'$, as shown in Figs. 2 and 3.

In putting the parts of the tire together the inner side of the connecting-flaps $a^5$ $a^5$ is cemented to the inner air-tube $a'$, and then the outer covering $a^3$ is cemented to the outer side of the said flaps, with the thickening of canvas $a^4$ located between the inner air-tube $a'$ and the outer covering $a^3$, the said thickening of canvas being adapted to prevent the accidental perforation of the tire by sharp or pointed objects encountered in the road, and at the same time preserving the desired flexibility of the tire, it being an extremely difficult matter to penetrate several layers of closely-woven canvas with a sharp nail or tack or piece of glass.

The strips of canvas which form the flaps $a^5$ $a^6$ are preferably connected to each other by stitching longitudinal seams at $d'$ $d'$, in addition to a layer of cement, between the said strips, and the rim D of the wheel may be covered with canvas preparatory to cementing the flaps $a^6$ thereto; but in case the tire E is to be attached to the rim D by lacing, as shown in Figs. 2 and 3, then the flaps $a^6 a^6$ are provided with the opposite eyelet-holes $e'$, through which the lacing-strings $j'$ are made to pass.

The edges $k'$ $k'$ of the rubber outer covering $a^3$ are made to abut against the side of the attaching-flap $a^6$ at the edge of the rim D of the wheel, thus forming an open groove around the inner side of the tire adapted to embrace the edges of the rim, and thus serve to brace the tire against laterally-directed pressure when the wheel is running in an inclined position. It is, however, to be understood that I do not limit my invention to the employment of the attaching-flaps $a^6 a^6$, as in many instances the pneumatic tire may be simply held in the hollow $o^2$ of the rim by means of cement, and in that case the edges $k'$ $k'$ of the open groove would abut directly against the edges $r'$ $r'$ of the rim C.

I claim as my invention—

1. A pneumatic tire consisting of the inner rubber air-tube provided with a textile covering adapted to prevent the bursting of the tube, the outer rubber covering, and the intervening textile layers, whereby the central tread portion of the tire will be protected from puncture and made stiffer than the sides, substantially as described.

2. The combination, with the wheel, the support for the same, and a pneumatic tire, of an air-pump attached to the hub of the wheel and connected with the cavity of the tire, and a cam jointed to the wheel-support and adapted to operate the piston of the pump, substantially as described.

3. The combination, with the wheel, the support for the same, a pneumatic tire, and an air-pump attached to the hub of the wheel and connected with the cavity of the tire, of the cam jointed to the wheel-support and adapted to operate the piston of the pump, and means for adjusting the inclination of the cam at the will of the rider to vary the action of the pump, substantially as described.

4. The combination, with the wheel, the support for the same, a pneumatic tire, and an air-pump for inflating the tire, of the exhaust-valve and means for operating the same at the will of the rider, substantially as described.

PARDON W. TILLINGHAST.

Witnesses:
SOCRATES SCHOLFIELD,
JOSEPH J. SCHOLFIELD.